US010990263B1

(12) United States Patent
Fortunato et al.

(10) Patent No.: US 10,990,263 B1
(45) Date of Patent: Apr. 27, 2021

(54) INTERFACE FOR TRIMMING VIDEOS

(71) Applicant: GoPro, Inc., San Mateo, CA (US)

(72) Inventors: Steven Fortunato, Solana Beach, CA (US); Joshua Hamill, Poway, CA (US); Evan Kosowski, San Diego, CA (US); Rachael Irene Hines Thompson, Oceanside, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/558,950

(22) Filed: Sep. 3, 2019

(51) Int. Cl.
*G06F 3/0484* (2013.01)
*G06F 3/0488* (2013.01)

(52) U.S. Cl.
CPC ........ *G06F 3/04847* (2013.01); *G06F 3/0488* (2013.01); *G06F 3/04845* (2013.01)

(58) Field of Classification Search
CPC .............. G06F 3/04847; G06F 3/0488; G06F 3/04845; G06F 3/04842; G11B 27/036
See application file for complete search history.

(56) References Cited

U.S. PATENT DOCUMENTS

| | | | | |
|---|---|---|---|---|
| 8,745,500 B1* | 6/2014 | Kostello | ................ | G11B 27/34 715/723 |
| 9,076,489 B1* | 7/2015 | Joseph | .................... | G11B 27/34 |
| 9,953,034 B1* | 4/2018 | Parlikar | .................. | G06F 16/40 |
| 10,324,605 B2* | 6/2019 | Matsuda | ............. | G06F 3/04847 |
| 10,515,665 B1* | 12/2019 | Stavchansky | ........ | G11B 27/031 |
| 2003/0146915 A1* | 8/2003 | Brook | ..................... | G11B 27/11 345/473 |
| 2005/0216840 A1* | 9/2005 | Salvucci | .............. | G11B 27/034 715/723 |
| 2010/0235746 A1* | 9/2010 | Anzures | ............... | G11B 27/034 715/723 |
| 2010/0281379 A1* | 11/2010 | Meaney | ............... | G11B 27/031 715/723 |
| 2011/0142420 A1* | 6/2011 | Singer | .................... | G06Q 30/02 386/280 |
| 2011/0258547 A1* | 10/2011 | Symons | .............. | G06F 3/04817 715/723 |
| 2012/0207452 A1* | 8/2012 | Wang | ................... | G11B 27/034 386/280 |
| 2012/0210221 A1* | 8/2012 | Khan | ................... | G11B 27/034 715/716 |
| 2012/0210231 A1* | 8/2012 | Ubillos | .................. | G11B 27/34 715/723 |

(Continued)

OTHER PUBLICATIONS

Andrew Mucci, "How to upload video to Twitter" (Feb. 23, 2016), YouTube, video screenshots attached, https://www.youtube.com/watch?v=pBwXNgzWoDc, Accessed Jul. 14, 2020 (Year: 2016).*

*Primary Examiner* — Kieu D Vu
*Assistant Examiner* — Rami R Okasha
(74) *Attorney, Agent, or Firm* — Esplin & Associates, PC

(57) ABSTRACT

A graphical user interface for trimming a video may include a timeline representation of a duration of the video. A trim duration for the video may be selected based on movement of the timeline representation. The amount of time represented by a portion of the timeline representation may be independent of the duration of the video. The movement of the timeline representation may correspond to moment through the duration of the video at a constant scale regardless of the duration of the video.

16 Claims, 5 Drawing Sheets

(56) References Cited

U.S. PATENT DOCUMENTS

| | | | | |
|---|---|---|---|---|
| 2012/0281960 | A1* | 11/2012 | Boncha | H04N 21/4223 |
| | | | | 386/224 |
| 2013/0047082 | A1* | 2/2013 | Long | G11B 27/031 |
| | | | | 715/708 |
| 2013/0094697 | A1* | 4/2013 | Adcock | G06F 16/78 |
| | | | | 382/103 |
| 2013/0332836 | A1* | 12/2013 | Cho | G11B 27/031 |
| | | | | 715/723 |
| 2014/0219629 | A1* | 8/2014 | McIntosh | H04N 21/8549 |
| | | | | 386/241 |
| 2015/0019972 | A1* | 1/2015 | Matsuda | G06F 3/04847 |
| | | | | 715/723 |
| 2015/0301708 | A1* | 10/2015 | Kostello | G11B 27/031 |
| | | | | 715/723 |
| 2016/0216871 | A1* | 7/2016 | Stamatiou | H04N 5/77 |
| 2016/0225408 | A1* | 8/2016 | Khan | H04N 5/772 |
| 2016/0247535 | A1* | 8/2016 | Latulipe | G06F 3/0481 |
| 2017/0024110 | A1* | 1/2017 | Xu | G06F 3/165 |
| 2017/0062006 | A1* | 3/2017 | Plom | H04N 9/87 |
| 2017/0278545 | A1* | 9/2017 | Woodward, Jr. | G11B 27/34 |
| 2018/0335901 | A1* | 11/2018 | Manzari | G06F 3/04883 |
| 2019/0051330 | A1* | 2/2019 | Moore | G11B 27/031 |

\* cited by examiner

INTERFACE FOR TRIMMING VIDEOS

FIELD

This disclosure relates to an interface for trimming videos.

BACKGROUND

Handles may be moved along a scrubber (video progress bar) to set a trim duration for a video. Movement of the handles along the scrubber may correspond to movement through the duration of the video content at non-constant scale. Handles may be small and difficult to manipulate. The use of the handles to set a trim duration for a video may not be intuitive and may not enable precise control in user determination of the trim duration.

SUMMARY

This disclosure relates to an interface for trimming videos. A touchscreen display may be configured to present video content and receive user input during the presentation of the video content. The touchscreen display may be configured to generate output signals indicating location of a user's engagement with the touchscreen display. The video content may have a duration. A graphical user interface and the video content may be presented on the touchscreen display. The graphical user interface may include interface elements and may facilitate interaction of the user with one or more of the interface elements via the user input. The interface elements may include a trim element, and/or other interface elements. User interaction with the trim element may be determined. Responsive to the user interaction with the trim element, a trim timeline element may be presented. The trim timeline element may include a timeline representation of the duration of the video content. The trim timeline element may enable selection of a trim duration for the video content based on movement of the timeline representation. A time amount of the duration represented by a portion of the timeline representation may be set independent of the duration of the video content such that the movement of the timeline representation corresponds to movement through the duration at a constant scale regardless of the duration. User interaction with the trim timeline element to move the timeline representation may be determined. The trim duration for the video content may be determined based on the movement of the timeline representation and/or other information. Trimmed video content may be generated based on the trim duration and/or other information.

A system that presents an interface for trimming videos may include one or more electronic storage, touchscreen display, processor and/or other components. The touchscreen display may be configured to present video content, graphical user interface, and/or other information. The touchscreen display may be configured to receive user input during the presentation of the video content. The touchscreen display may be configured to generate output signals indicating location of a user's engagement with the touchscreen display.

The electronic storage may store video information defining video, information relating to video content, information relating to graphical user interface, information relating to interface elements of the graphical user interface, information relating to trimming of video content, information relating to trim duration, information relating to trimmed video content and/or other information.

Content of one or more videos may be referred to as video content. Video content may have a duration. Video content may include visual content viewable as a function of progress through the duration of the video content.

The processor(s) may be configured by machine-readable instructions. Executing the machine-readable instructions may cause the processor(s) to facilitate presenting an interface for trimming videos. The machine-readable instructions may include one or more computer program components. The computer program components may include one or more of a presentation component, a user interaction component, a trim duration component, a trimmed video content component, and/or other computer program components.

The presentation component may be configured to present one or more graphical user interfaces, the video content, and/or other information on the touchscreen display. The graphical user interface(s) may include interface elements. The graphical user interface(s) may facilitate interaction of the user with one or more of the interface elements via the user input received through the touchscreen display and/or other user input. The interface elements may include a trim element, a trim timeline element, and/or other interface elements. In some implementations, the interface elements may further include a trim position element. In some implementations, the interface elements may further include one or more handle elements. In some implementations, the interface elements may include a floating shortcut element. In some implementations, the interface elements may further include a summary trim element.

The presentation component may be configured to present one or more interface elements responsive to user interaction with one or more other interface elements and/or other information. The presentation component may be configured to, responsive to user interaction with the trim element, present the trim timeline element. The trim timeline element may include a timeline representation of the duration of the video content. The trim timeline element may enable selection of a trim duration for the video content based on movement of the timeline representation. A time amount of the duration represented by a portion of the timeline representation may be set independent of the duration of the video content such that the movement of the timeline representation corresponds to movement through the duration at a constant scale regardless of the duration of the video content. In some implementations, the trim position element may be presented on top of the timeline representation to indicate the current play position for the video content.

The presentation component may be configured to, responsive to movement of the timeline representation based on the user interaction with the trim timeline element, present a first handle element. The first handle element may represent a first end of the trim duration. The presentation component may be configured to, responsive to fixing of the trim duration, present a second handle element. The second handle element may represent a second end of the trim duration. The first handle element and/or the second handle element may be manipulatable along the timeline representation to change the trim duration.

In some implementations, the first handle element and/or the second handle element may be presented as one or more floating shortcut elements within the timeline representation based on a current view of the timeline representation not including the first end and/or the second end of the trim duration and/or other information.

The presentation component may be configured to present the summary trim element. The summary trim element may indicate a relative position of the trim duration within the duration.

The user interaction component may be configured to determine user interaction with one or more of the interface elements. The user interaction component may be configured to determine user interaction with one or more of trim element, trim timeline element, trim position element, first handle element, second handle element, summary trim element, and/or other interface elements. For example, the user interaction component may be configured to determine user interaction with the trim element. The user interaction component may be configured to determine user interaction with the trim timeline element to move the timeline representation. The user interaction with the trim timeline element to move the timeline representation may include dragging the timeline representation. The user interaction with the trim timeline element to move the timeline representation may include engaging a play element to cause playback of the video content.

The movement of the timeline representation based on the user interaction with the trim timeline element may cause the current play position for the video content to be changed. The movement of the timeline representation based on the user interaction with the trim timeline element may cause the first handle element to be presented.

The user interaction component may be configured to determine user interaction with one or more of the interface elements (e.g., the trim element) to fix the trim duration. Fixing of the trim duration may cause the second handle element to be presented.

The user interaction component may be configured to determine user interaction with the first handle element and/or the second handle element. The user interaction with the first handle element and/or the second handle element may include manipulation of the first handle element and/or the second handle element. The first handle element and/or the second handle element may be manipulated along the timeline representation to change the trim duration.

The user interaction component may be configured to determine user interaction with the floating shortcut element (s). The user interaction with a floating shortcut element may cause movement of the timeline representation to include the corresponding end (the first end, the second end) of the trim duration within the current view of the timeline representation.

The trim duration component may be configured to determine the trim duration for the video content based on the movement of the timeline representation and/or other information. The movement of the timeline representation may be caused by dragging of the timeline representation and/or playback of the video content. The relative position of the trim duration within the duration of the video content may be indicated by the summary trim element.

The trimmed video content component may be configured to generate trimmed video content based on the trim duration and/or other information. The trimmed video content may include the visual content of the video content within the trim duration.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
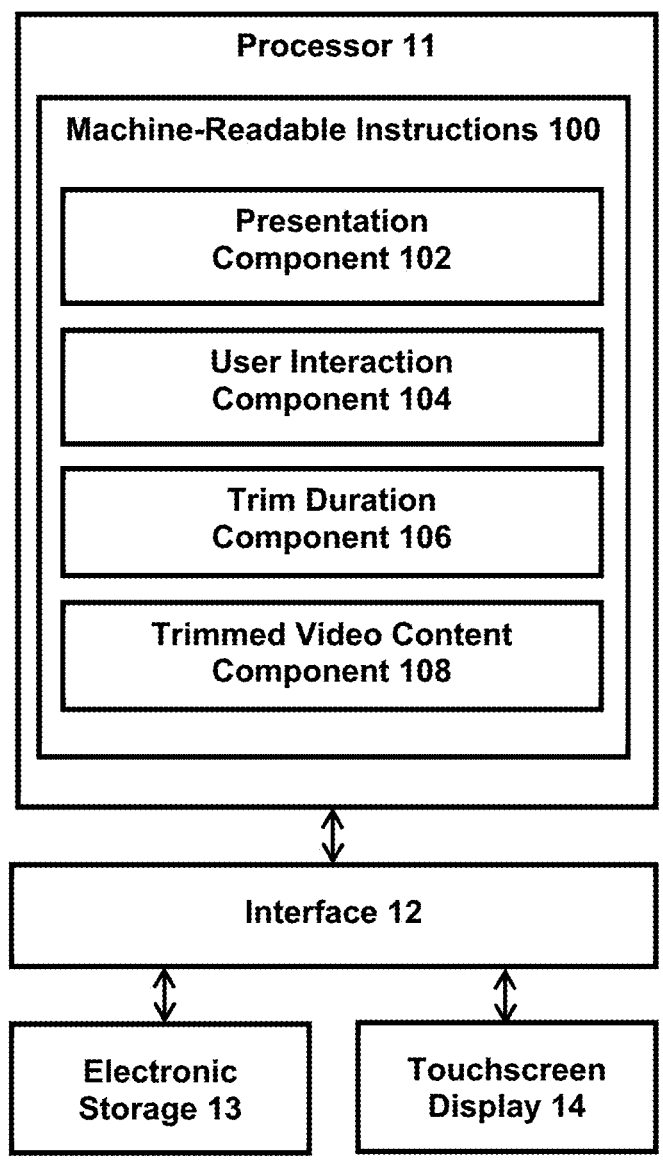
FIG. 1 illustrates a system that presents an interface for trimming videos.

FIG. 1 illustrates a system 10 for presenting an interface for trimming videos. The system 10 may include one or more of a processor 11, an interface 12 (e.g., bus, wireless interface), an electronic storage 13, a touchscreen display 14, and/or other components. The touchscreen display 14 may be configured to present video content and receive user input during the presentation of the video content. The touchscreen display 14 may be configured to generate output signals indicating location of a user's engagement with the touchscreen display 14. The video content may have a duration. A graphical user interface and the video content may be presented on the touchscreen display 14.

The graphical user interface may include interface elements and may facilitate interaction of the user with one or more of the interface elements via the user input. The interface elements may include a trim element, and/or other interface elements. User interaction with the trim element may be determined. Responsive to the user interaction with the trim element, a trim timeline element may be presented. The trim timeline element may include a timeline representation of the duration of the video content. The trim timeline element may enable selection of a trim duration for the video content based on movement of the timeline representation. A time amount of the duration represented by a portion of the timeline representation may be set independent of the duration of the video content such that the movement of the timeline representation corresponds to movement through the duration at a constant scale regardless of the duration. User interaction with the trim timeline element to move the timeline representation may be determined. The trim duration for the video content may be determined based on the movement of the timeline representation and/or other information. Trimmed video content may be generated based on the trim duration and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information defining video, information relating to video content, information relating to graphical user interface, information relating to interface elements of the graphical user interface, information relating to trimming of video content, information relating to trim duration, information relating to trimmed video content and/or other information.

Content of one or more videos may be referred to as video content. Video content may have a duration. That is, a video may include video content having a duration. A duration may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other durations, time durations, and frame numbers are contemplated.

Video content may include visual content, audio content, and/or other content. For example, video content may include visual content viewable as a function of progress through the duration of the video content, audio content playable as a function of progress through the duration of the video content, and/or other content that may be played back as a function of progress through the duration of the video content.

Visual content may refer to content of one or more images and/or one or more videos that may be consumed visually. For example, visual content may be included within one or more image and/or one or more video frames of a video. The video frame(s) may define the visual content of the video content. That is, video content may include video frame(s) that define the visual content of the video content. Video frame(s) may define visual content viewable as a function of progress through the duration of the video content. A video frame may include an image of the video content at a moment within the duration of the video content. Visual content may be generated based on light received within a field of view of a single image sensor or within fields of view of multiple image sensors during a capture period.

Audio content may include audio/sound captured (e.g., by sound sensor(s), microphone(s)) with the capture of the visual content and/or audio/sound provided as an accompaniment for the visual content. Audio content may include one or more of voices, activities, songs, music, and/or other audio/sounds. For example, audio content may include sounds captured by a single sound sensor or an array of sound sensors. The sound sensor(s) may receive and convert sounds into output signals. The output signals may convey sound information and/or other information. The sound information may define audio content in one or more formats, such as WAV, MP3, MP4, RAW. Audio content may include audio/sound generated by one or more computing devices, such as procedural audio. Audio content may be synchronized with the visual content. For example, audio content may include music, song, and/or soundtrack, and the visual content of the video content may be synchronized with music, song, and/or soundtrack.

The touchscreen display 14 may be configured to present video content, graphical user interface, and/or other information. The touchscreen display 14 may be configured to receive user input during the presentation of the video content. The touchscreen display 14 may be configured to generate output signals indicating location on the touchscreen display 14 of a user's engagement with the touchscreen display 14. User input (e.g., for video content, for video application to trim video content) may be received/determined based on the touchscreen output signals. For example, the touchscreen display 14 may include a touchscreen display of a mobile device (e.g., camera, smartphone, smartwatch, tablet, laptop) or a desktop device (e.g., touch monitor), and user may engage with the touchscreen display 14 to provide user input for video content presented on the touchscreen display 14 and/or video application used to trim the video content. In some implementations, user input may be provided through user engagement with other user interface devices, such as a keyboard, a mouse, a trackpad, and/or user interface devices. For example, video content and graphical user interface may be presented on a non-touchscreen display, and user interaction with one or more elements of the graphical user interface may be determined and/or facilitated through the user's engagement with a mouse.

The touchscreen display 14 may include one or more touch-sensitive screens and/or other components. A user may engage with the touchscreen display 14 by touching one or more portions of a touch-sensitive screen (e.g., with one or more fingers, stylus). A user may engage with the touchscreen display 14 at a moment in time, at multiple moments in time, during a period, and/or during multiple periods. A user may tap on or move along the touchscreen display 14 to interact with video content presented the touchscreen display 14 and/or to interact with an application for trimming video content. For example, a user may tap on one or more portions of the touchscreen display 14 corresponding to one or elements of the graphical user interface presented on the touchscreen display 14 to interact (e.g., engage, toggle, manipulate) with the element(s). A user may make a moving motion (e.g., holding one or more fingers on the touchscreen display 14 and moving the finger(s) in one or more particular directions) to effectuate changes to a corresponding one or more elements of the graphical user interface presented on the touchscreen display 14.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate presenting an interface for trimming videos. The machine-readable instructions 100 may include one or more computer program components. The machine-readable instructions 100 may include one or more of a presentation component 102, a user interaction component 104, a trim duration component 106, a trimmed video content component 108, and/or other computer program components.

The presentation component 102 may be configured to present one or more graphical user interfaces, the video content, and/or other information on the touchscreen display. A graphical user interface may refer to a user interface that enables a user to interact with the system 10 through one or more interface elements. A graphical user interface may be static or dynamic. A graphical user interface may include a static configuration of interface elements and/or include dynamic configurations of interface elements that changes (e.g., with time, based on user interaction with one or more interface elements). Multiple ones of interface elements may be presented/included within a graphical user interface at the same time, may be presented/included within a graphical user interface at different times, and/or may be presented/included within a graphical user interface responsive to user interaction with one or more other interface elements and/or other information.

An interface element may refer to a graphical element of the user interface, such as windows, icons, buttons, graphics, and/or other visual indicators. An interface element may visually provide information and/or enable a user to provide inputs to the system 10. For example, an interface element may visually provide information determined by the system 10 and/or a user may interact (e.g., engage, toggle, manipulate) with an interface element to provide one or more input to the system 10. A graphical user interface may facilitate interaction of the user with one or more of the interface elements via the user input received through one or more user interface devices (e.g., the touchscreen display 14, a keyboard, a mouse, a trackpad) and/or other user input. For example, a graphical user interface present/include the interface elements in a particular arrangement and enable the user to interact with individual interface elements by engaging with locations corresponding to the individual interface elements on the touchscreen display 14.

The interface elements may include one or more of a trim element, a trim timeline element, a trim position element, a handle element, a floating shortcut element, a summary trim element, and/or other interface elements. A trim element may refer to an interface element that enables a user to provide input to the system 10 to start trimming of a video. For example, a trim element may be presented/included within the graphical user interface as a button and user interaction (e.g., tapping, clicking on) with the button may provide one or more commands/information to the system 10 to start a trimming mode and/or a trimming operation. In the trimming mode and/or the trimming operation, the graphical user interface may provide with one or more interface elements that may be interacted by the user to determine a trim duration for the video.

A trim timeline element may refer to an interface element that visually represents the duration of the video content. The trim timeline element may include one or more timeline representations of the duration of the video content. The trim timeline element may refer to an interface element that enables a user to provide input to the system 10 based on movement of a timeline representation to determine the trim duration for the video. The trim timeline element may enable selection of a trim duration for the video content based on movement of a timeline representation. A certain amount of movement of the timeline representation (e.g., reverse movement by a certain amount, forward movement by a certain amount) may correspond to movement through the duration of the video content at a constant scale regardless of the duration of the video content. The time amount of the duration of the video content represented by a portion of the timeline representation, rather than being determined based on the duration of the video content, may be set independent of the duration of the video content.

For example, a traditional scrubber (video progress bar) may represent the duration of the video content. The scrubber may have a certain size (e.g., length) within the graphical user interface. The size of the scrubber within the graphical user interface may represent the duration of the video content, and a portion (e.g., segment) of the scrubber may correspond to a portion of the duration of the video content at a non-constant scale. For example, for video content with a duration of ten minutes, the length of the scrubber may represent ten minutes and ten percent of the length of the scrubber may correspond to one minute of the duration of the video content. On the other hand, for video content with a duration of one minute, the length of the scrubber may represent one minute and ten percent of the length of the scrubber may correspond to six seconds of the duration of the video content. A traditional scrubber may enable determination of a trim duration for video content via movement of handles on one or more ends of the traditional scrubber. However, because movement of the handles along the scrubber correspond to movement through the duration of the video content at non-constant scale (same amount of movement of the handle corresponding to different time amount depending on the duration of the video content), the use of the handles may not be intuitive and may not enable precise control in user determination of the trim duration for the video content.

The timeline representation of the duration within the trim timeline element, on the other hand, may represent a certain time amount regardless of the duration of the video content. The timeline representation may have a certain size (e.g., length) within the graphical user interface. The size of the timeline representation within the graphical user interface may represent a certain time amount rather than the entire duration of the video content. A portion (e.g., segment) of the timeline representation may correspond to a fixed time duration. Setting the time amount represented by a portion of the timeline representation independent of the duration of the video content may result in the movement of the timeline representation corresponding to movement through the duration at a constant scale regardless of the duration of the video content For example, for video content with durations of ten minutes and one minute, ten percent of the length of the scrubber may correspond to ten seconds of the duration of the video content. Other time amount correspondence is contemplated. The time amount represented by the timeline representation may be set based on one or more defaults and/or based on user input. The movement of the timeline representation corresponding to movement through the duration of the video content at a constant scale may make it easier for users to control the amount of duration of the video content to be included within the trim duration. Because the same amount of movement of the timeline representation corresponds to the same amount of the duration of the video content regardless of the duration of the video content, users may learn to precisely control the trim duration based on repeated movement of the timeline representation.

The timeline representation may enable selection (e.g., initial selection) of a trim duration for the video content based on movement of a timeline representation. That is, rather than requiring a user to use movement of one or more handles along the timeline representation to determine the trim duration, the user may set the trim duration by moving the timeline representation itself. For example, the user may change the trim duration for the video content by moving (e.g., dragging) the timeline representation to the left or right/up or down to "draw" out the desired trim duration. Moving the timeline representation, which is bigger than handles, to determine the trim duration may be easier and more intuitive than use of the handles. Such selection of the trim duration may provide intuitive and granular control over finely tuned start/stop points of the trim duration, and may enable precise control in user determination of the trim duration for the video content. Such selection of the trim duration may provide more fluid experience in setting trim duration than usage of handles. In some implementations, one or more handles may be manipulated after the initial selection of a trim duration for the video content based on movement of a timeline representation, and the handle(s) may be manipulated to adjust the start/stop points of the trim duration.

A trim position element may refer to an interface element that visually represents current trim position for the video content. The current trim position may refer to the current positioning of an end of the trim duration. One side of the trim position element may depict portion of the duration of the video content included within the trim duration and the other side of the trim position element may depict portions of the duration of the video content not included within the trim duration. The movement of the timeline representation may cause change in the trim positions of the video content (changing which time points of the video content are included within the trim duration), and the trim position element may visually indicate the current time position of the video content. A trim position element may visually represent the current play position for the video content. The movement of the timeline representation may cause change in the play position of the video content (changing which time points of the video content is being presented on the touchscreen display 14), and the trim position element may visually indicate the current time point of the video content that is being presented on the touchscreen display 14.

In some implementations, the trim position element may be presented on top of the timeline representation to indicate the current play position for the video content. The trim position element may be located at the middle of the timeline representation and/or at other locations along the timeline representation. In some implementations, the movement of the timeline representation to select the trim duration may include movement of the timeline representation along one or more sides of the trim position element. For example, the movement of the timeline representation may include the user dragging the timeline representation to the left or right/up or down of the trim position element.

A handle element may refer to an interface element that visually represents an end of a trim duration for the video content. For example, the graphical user interface may present/include two handle elements along the timeline representation, with one handle element representing one end (e.g., beginning) of the trim duration and the other handle element representing other end (e.g., ending) of the trim duration. After the trim duration has been initially determined based on movement of the timeline representation, one or both of the handle elements may be manipulatable along the timeline representation to change the trim duration (e.g., shorten/lengthen trim duration, change beginning/ending of the trim duration).

A floating shortcut element may refer to an interface element that visually represents a handle element with a corresponding end of the trim duration not being within the current view of the timeline representation. Based on movement of the timeline representation, one or both ends of the trim duration may not be presented/included within the graphical user interface. Based on an end of the trim duration not being included within the current view of the timeline representation, the corresponding handle element may be presented as a floating shortcut element within the timeline representation. User interaction (e.g., tapping, clicking on) with a floating shortcut element may provide one or more commands/information to the system 10 to move the timeline representation to include the corresponding end of the trim duration. That is, the floating shortcut element may operate as a shortcut to see/go to the corresponding end of the trim duration.

A summary trim element may refer to an interface element that visually represents one or more trim durations within the graphical user interface. The summary trim element may visually indicate relative position(s) of the trim duration(s) within the duration. For example, the duration of the video content may be represented as a bar, portion(s) of the duration within trim duration(s) may be represented differently (e.g., in different color/pattern) than other portion(s) of the duration of the video content within the bar.

The presentation component 102 may be configured to present one or more interface elements responsive to user interaction with one or more other interface elements and/or other information. For example, the presentation component 102 may be configured to, responsive to user interaction with the trim element, present the trim timeline element and/or other interface element. The presentation component 102 may be configured to, responsive to movement of the timeline representation based on the user interaction with the trim timeline element, present a handle element representing one end of the trim duration. The presentation component 102 may be configured to, responsive to fixing of the trim duration, present another handle element representing another end of the trim duration.

FIGS. 3A, 3B, 3C, 3D, 3E, and 3F illustrate example graphical user interface and interface elements for trimming videos. These graphical user interfaces and interface elements are provided merely as examples, and the arrangement and visual aspects of the graphical user interfaces and interface elements may vary depending on the implementation. In some implementations, the graphical user interfaces and/or interface elements may include additional features and/or alternative features.

Figure 3A:
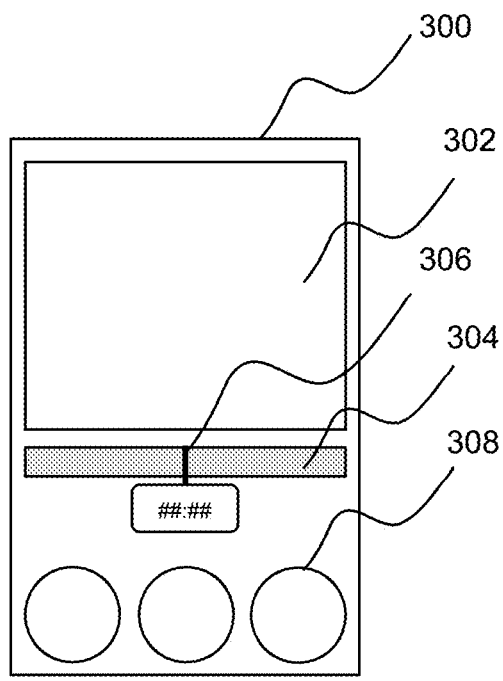
FIGS. 3A, 3B, 3C, 3D, 3E, and 3F illustrate example graphical user interface and interface elements for trimming videos.

FIGS. 3A, 3B, 3C, and 3D illustrate a graphical user interface 300. Referring to FIG. 3A, the graphical user interface 300 may include a video content playback portion 302. The video content playback portion 302 may include presentation of video content. The graphical user interface 300 may include a scrubber 304 and a play position element 306. The scrubber 304 may represent the duration of the video content being presented within the video content playback portion 302, and the play position element may visually represent current play position for the video content. The play position element 306 may display time position (e.g., minute:second) of the video content that is being presented within the video content playback portion 302. The graphical user interface 300 may include one or more interface elements to provide one or more commands to the system 10. For example, the graphical user interface 300 may include a trim element 308 (e.g., trim button), and a user may interact (e.g., tap, click on) the trim element to provide one or more commands/information to the system 10 to start a trimming mode and/or a trimming operation.

Figure 3B:
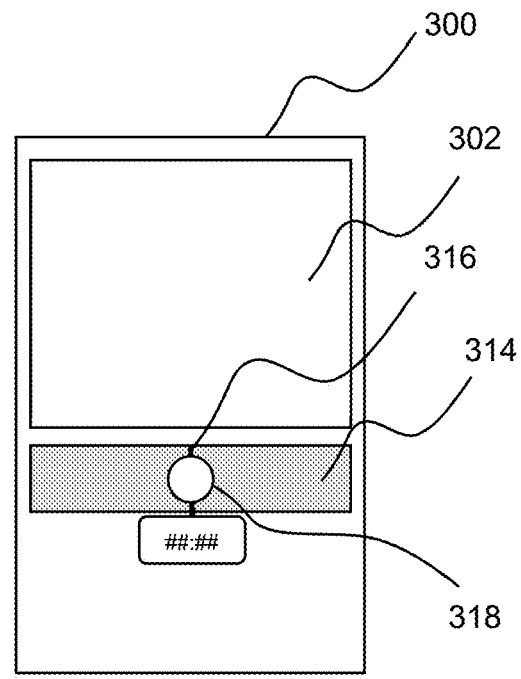

Responsive to user interaction with the trim element 308, the graphical user interface 300 may be changed as shown in FIG. 3B. Responsive to user interaction with the trim element 308, the graphical user interface 300 may be changed to present/include a trim timeline element 314 and/or other interface elements. In some implementations, the scrubber 304 may be changed into the trim timeline element 314. In some implementation, rather than changing an existing graphical user interface, a new graphical user interface may be presented.

The trim timeline element 314 may include a timeline representation of the duration of the video content. A portion or entirety of the trim timeline element 314 may be the timeline representation of the duration of the video content. A trim position element 316 may be presented on top of the trim timeline element 314. The trim position element 316 may be located at the middle of the trim timeline element 314. The trim position element 316 may visually represent current trim position for the video content. The trim position element 316 may indicate the current play position for the video content. The trim position element 316 may display time position (e.g., minute:second) of the video content that is being presented within the video content playback portion 302 and/or the current trim position for the video content.

The graphical user interface 300 may include a trim duration setting element 318. The trim duration setting element 318 may refer to an interface element that enables a user to provide input to the system 10 to set the trim duration for the video content to a certain duration. The trim duration setting element 318 may refer to an interface element that enables a user to provide input to the system 10 to set the trim duration for the video content to a duration determined based on movement of the trim timeline element 314/timeline representation. For example, the trim duration setting element may be presented/included within the graphical user interface 300 as a button and user interaction (e.g., tapping, clicking on) with the button may provide one or more commands/information to the system 10 to set the trim duration for the video content.

The trim timeline element 314/timeline representation of the duration of the video content may be moved with respect to the trim position element 316 to determine the trim duration for the video content. The time amount of the duration of the video content represented by a portion of the trim timeline element 314/timeline representation may be set independent of the duration of the video content. A certain amount of movement of the trim timeline element 314/timeline representation (e.g., reverse movement by a certain amount, forward movement by a certain amount) may correspond to movement through the duration of the video content at a constant scale regardless of the duration of the video content.

Figure 3C:
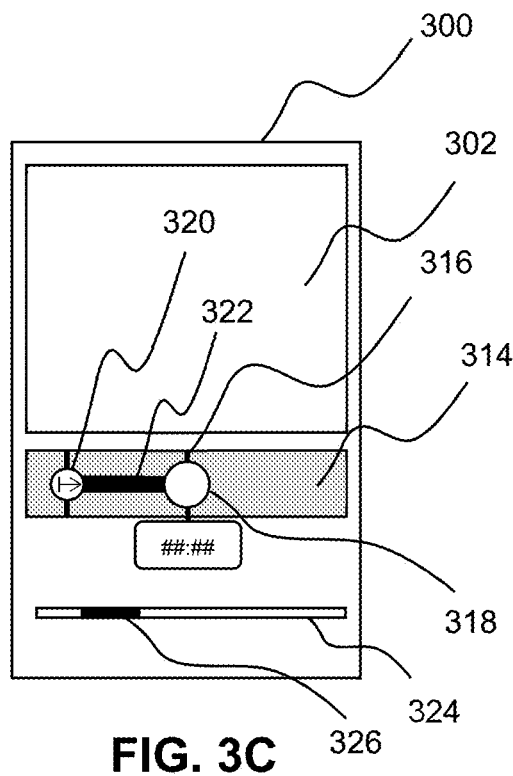

For example, referring to FIG. 3C, user interaction with the trim timeline element 314/timeline representation may have moved the trim timeline element 314/timeline representation to one side (the left) of the time position element 316. A portion 322 of the trim timeline element 314/timeline representation may correspond to the portion that was moved to one side (the left) of the trim position element 316. The movement of the portion 322 to one side (the left) of the trim position element 316 may cause the corresponding portion of the duration of the video content to be included within a trim duration for the video content. The relative position of the trim duration within the duration of the video content may be visually represented within a summary trim element 324. For example, a portion 326 of the summary trim element 324 may be represented differently (e.g., in different color/pattern) than other portion(s) of the duration of the video content within the summary trim element 324. In some implementations, multiple portions of the duration of the video content may be included within a trim duration. In some implementations, multiple trim durations including non-adjacent portions of the duration of the video content may be determined. For example, referring to FIG. 3E, portions 326, 356 of the summary trim element 324 may be represented differently within the summary trim element 324 based on the two corresponding portions of the duration of the video content being included within the trim duration(s). In some implementations, user interaction with the summary trim element 324 may change one or more trim durations. For example, a user may drag the portions 326, 356 to change which portions of the duration of the video content are included within the trim duration(s). The user may interact with the portions 326, 356 to remove the portion(s) from the trim duration(s).

Responsive to movement of the trim timeline element 314/timeline representation based on the user interaction, a handle element 320 may be presented. The handle element 320 may represent one end (e.g., beginning, ending) of the trim duration. For instance, the handle element 320 may represent a point in the within the duration of the video content that was represented by the middle portion of the trim timeline element 314/timeline representation in FIG. 3B. Movement of the trim timeline element 314/timeline may have caused this portion of the trim timeline element 314/timeline representation to be pushed to the left of the trim position element 316 in FIG. 3C. The handle element 320 may be located at this portion of the trim timeline element 314/timeline representation that was pushed to the left of the trim position element 316.

Figure 3D:
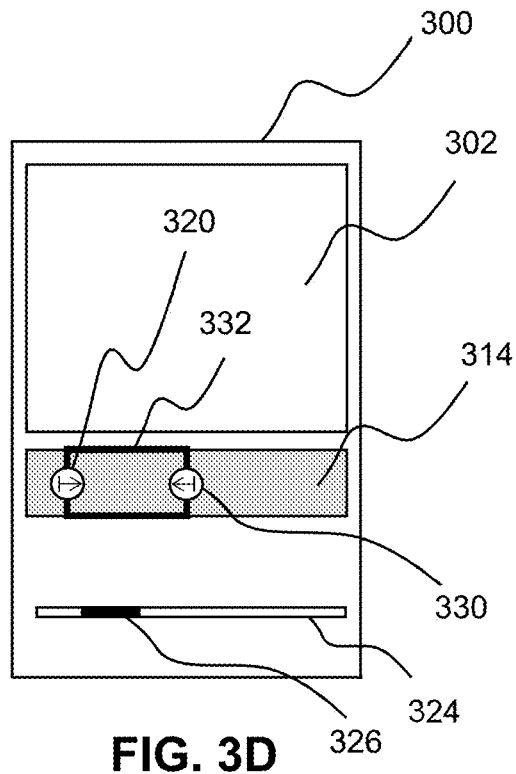
Figure 3E:
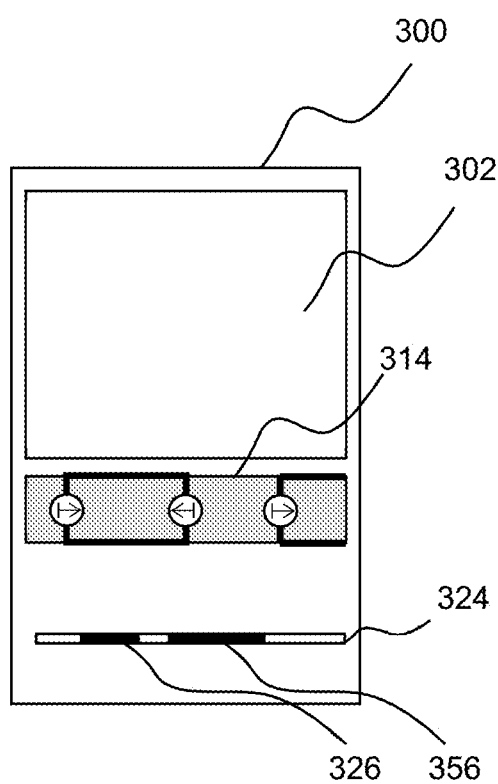

Referring to FIG. 3D, responsive to fixing of the trim duration, a handle element may be presented. Fixing of the trim duration may include setting in place of the trim duration based on prior movement of the trim timeline element 314/timeline representation. The trim duration may be fixed responsive to user interaction with the trim duration setting element 318, other user interaction with the graphical user interface 300, and/or other information. The handle element 330 may represent the other end (e.g., ending, beginning) of the trim duration. The handle elements 320, 330 may be manipulatable along the trim timeline element 314/timeline representation to change the trim duration.

Figure 3F:
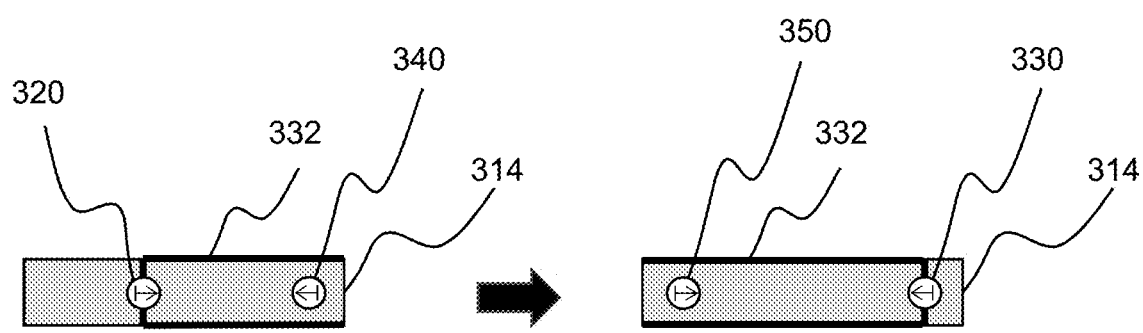

In some implementations, the movement of the trim timeline element 314/timeline representation may cause one or both ends of the trim duration to not be presented/included within the graphical user interface. For example, referring to FIG. 3F, the movement of the trim timeline element 314/timeline representation may cause one end (beginning) of the time duration corresponding to the handle element 320 to be presented/included within the graphical user interface and the other end (ending) of the time duration corresponding to the handle element 330 to not be presented/included within the graphical user interface. Based on the end (ending) of the trim duration not being included within the current view of the timeline representation, the corresponding handle element 330 may be presented as a floating shortcut element 340 within the timeline representation. User interaction (e.g., tapping, clicking on) with the floating shortcut element 340 may provide one or more commands/information to the system 10 to move the timeline representation to include the corresponding end (ending) of the trim duration. That is, the floating shortcut element 340 may operate as a shortcut to see/go to the corresponding end (ending) of the trim duration. As shown in FIG. 3F, the movement of the timeline representation to include the ending of the trim duration may result in the handle element 330 being presented/included within the graphical user interface. The handle element 320 may not be presented/included within the graphical user interface, and the handle element 320 may be presented as a floating shortcut element 350 within the timeline representation. User interaction (e.g., tapping, clicking on) with the floating shortcut element 350 may provide one or more commands/information to the system 10 to move the timeline representation to include the corresponding end (beginning) of the trim duration. That is, the floating shortcut element 350 may operate as a shortcut to see/go to the corresponding end (beginning) of the trim duration.

The user interaction component 104 may be configured to determine user interaction with one or more of the interface elements. User interaction with interface element(s) may be determined based on user engagement with one or more user interface devices, such as the touchscreen display 14, a keyboard, a mouse, a trackpad, and/or other user interface devices. For example, based on output signals generated by the touchscreen display 14, the location of user engagement with the touchscreen display 14 may be determined, and the location of the touchscreen display may correspond to one or more user interacted interface elements.

The user interaction component 104 may be configured to determine user interaction with one or more of trim element, trim timeline element, trim position element, handle element, handle element, summary trim element, and/or other interface elements. For example, the user interaction component 104 may be configured to determine user interaction with the trim element (to start a trimming mode and/or a trimming operation). The user interaction component 104 may be configured to determine user interaction with the trim timeline element to move the timeline representation. The movement of the timeline representation based on the user interaction with the trim timeline element may cause a handle element representing one end (e.g., beginning, ending) of the trim duration to be presented. The movement of the timeline representation based on the user interaction with the trim timeline element may cause the current play position for the video content to be changed. That is, different moments within the duration of the video content may be presented based on movement of the timeline representation.

In some implementations, the user interaction with the trim timeline element to move the timeline representation may include dragging the trim timeline element/timeline representation (e.g., left or right, up or down). In some implementations, the user interaction with the trim timeline element to move the timeline representation may include engaging a play element to cause playback of the video content. For example, referring to FIG. 3C, the user may have dragged the trim timeline element 314/timeline representation to the left of the trim position element 316, and the portion 322 may correspond to the portion that was moved to the left of the trim position element 316. As another example, the user may have interacted with a play element, and user interaction (e.g., tapping, clicking on) with the play element may provide one or more commands/information to the system 10 to cause playback of the video content. The playback of the video content may cause the trim timeline element 314/timeline representation to move to the left, and the portion 322 may correspond to the portion that was moved to the left of the trim position element 316 during playback of the video content. The movement of the portion 322 to the left of the trim position element 316 may cause the corresponding portion of the duration of the video content to be included within a trim duration for the video content.

The user interaction component 104 may be configured to determine user interaction with one or more of the interface elements (e.g., the trim element, the trim duration setting element) to fix the trim duration. Fixing of the trim duration may cause another handle element representing another end (e.g., ending, beginning) of the trim duration to be presented.

The user interaction component 104 may be configured to determine user interaction with one or more handle elements. The user interaction with at handle element may include manipulation of the handle element. The handle element may be manipulated along the timeline representation to change the trim duration.

The user interaction component 104 may be configured to determine user interaction with one or more floating shortcut elements. The user interaction with a floating shortcut element may cause movement of the timeline representation to include the corresponding end (beginning, ending) of the trim duration within the current view of the timeline representation. Other determinations of user interaction with interface elements are contemplated.

The trim duration component 106 may be configured to determine the trim duration for the video content based on the movement of the timeline representation and/or other information. The movement of the timeline representation may be caused by dragging of the timeline representation and/or playback of the video content. The trim duration for the video content may be determined based on amount by which the timeline representation has been moved by the user. For example, the trim duration for the video content may be determined to include portion(s) of the video content that has been moved past/across the trim position element. For example, referring to FIG. 3C, the portion 322 may include the portion of the trim timeline element 314/timeline representation that has been moved past/across the trim position element 316. The trim duration for the video content may be determined to include the portion of the duration of the video content corresponding to the portion 322. The relative position of the trim duration within the duration of the video content may be indicated by the portion of the summary trim element 324.

The trimmed video content component 108 may be configured to generate trimmed video content based on the trim duration and/or other information. The trimmed video content may include portion(s) of the video content corresponding to the portion(s) of the duration of the video content included within the trim duration. The trimmed video content may include the visual content, the audio content, and/or other content of the video content within the trim duration. That is, the trimmed video content may include the visual content corresponding to the portion(s) of the duration of the video content included within the trim duration. The trimmed video content may include the audio content corresponding to the portion(s) of the duration of the video content included within the trim duration. The trimmed video content may include other content corresponding to the portion(s) of the duration of the video content included within the trim duration. In some implementations, the trimmed video content component 108 may include one or more effects within the trimmed video content. For example, based on the trimmed video content including separate portions of the duration of the video content, the trimmed video content component 108 may include one or more transition effects between the separate portions. The trimmed video content component 108 may include one or more audio effects (e.g., soundtrack(s), changes in volume of soundtrack(s)) within the trimmed video content (e.g., changing soundtrack volume based on inclusion of highlight moments in the trimmed video content).

The trimmed video content may be generated as encoded video content and/or as instructions for rending the trimmed video content. For example, the trimmed video content may be generated as an encoded version of a particular video clip, and the video clip may be opened in a video player for presentation. The trimmed video content may be generated as instructions identifying portions of the duration of the video content included within the trim duration and/or one or more effects to be included within the playback of the trimmed video content. A video player may use the instructions to retrieve the portions of the video content identified in the instructions and/or cause the effects identified in the instructions for presentation when the trimmed video content is opened/to be presented.

Trimmed video content information defining the trimmed video content (e.g., encoded video content, instructions) may be stored in one or more storage media. For example, the trimmed video content information may be stored in the electronic storage 13, remote storage locations (storage media located at/accessible through a server), and/or other locations.

In some implementations, video content may include one or more of spherical video content, virtual reality content, and/or other video content. Spherical video content and/or virtual reality content may include visual content viewable from one or more points of view as a function of progress through the progress length of the spherical/virtual reality video content.

Spherical video content may refer to video content generated through capture of multiple views from a location. Spherical video content may be captured through the use of one or more image capture devices to capture images/videos from a location. The captured images/videos may be stitched together to form the spherical video content. Spherical video content may include full spherical video content (360 degrees of capture) or partial spherical video content (less than 360 degrees of capture). Partial spherical video content may be referred to as panoramic video content.

Visual content of spherical video content may be included within one or more spherical video frames of the spherical video. The spherical video frame(s) may define the visual content of the video content. That is, spherical video content may include spherical video frame(s) that define the visual content of the spherical video content. Spherical video frame(s) may define visual content viewable from a point of view (e.g., within a sphere, center of a sphere) as a function of progress through the progress length of the spherical video content.

A spherical video frame may include a spherical image of the spherical video content at a moment within the progress length of the spherical video content. Visual content of spherical video content may be generated based on light received within a field of view of a single image sensor or within fields of view of multiple image sensors during a capture period. For example, multiple images/videos captured by multiple cameras/image sensors may be combined/stitched together to form the visual content of the spherical video content. The field of view of camera(s)/image sensor (s) may be moved/rotated (e.g., via movement/rotation of optical element(s), such as lens, of the image sensor(s)) to capture multiple images/videos from a location, which may be combined/stitched together to form the visual content of the spherical video content.

For example, multiple images captured by multiple cameras/images sensors at a moment in time may be combined/stitched together to form a spherical video frame for the moment in time. A spherical video frame may include a full spherical image capture (360-degrees of capture, including opposite poles) or a particular spherical image capture (less than 360-degrees of capture). A spherical image (e.g., spherical video frame) may be comprised of multiple sub-images (sub-frames). Sub-images may be generated by a single image sensor (e.g., at different times as the field of view of the image sensor is rotated) or by multiple image sensors (e.g., individual sub-images for a moment in time captured by individual image sensors and combined/stitched together to form the spherical image).

In some implementations, spherical video content may be stored with at least a 5.2K resolution. Using a 5.2K spherical video content may enable viewing windows (e.g., directed to a portion of a spherical video frame) for the spherical video content with resolution close to 1080p. In some implementations, spherical video content may include 12-bit video frames. Other sizes and qualities of spherical video content (e.g., 5.6K, 8K+) are contemplated. In some implementations, spherical video content may be consumed as virtual reality content.

Virtual reality content may refer to video content that may be consumed via virtual reality experience. Virtual reality content may associate different directions within the virtual reality content with different viewing directions, and a user may view a particular visual portion (e.g., visual content in a particular direction) within the virtual reality content by looking in a particular direction. For example, a user may use a virtual reality headset to change the user's direction of view. The user's direction of view may correspond to a particular direction of view within the virtual reality content. For example, a forward/north looking direction of view for a user may correspond to a forward/north direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video content captured from a path taken by the image capture device(s) in the moving position. For example, spherical video content and/or virtual reality content may include video content captured by a spherical camera of a person walking around in a music festival.

While the present disclosure may be directed to video content, one or more other implementations of the system may be configured for other types media content. Other types of media content may include one or more of audio content (e.g., music, podcasts, audio books, and/or other audio content), multimedia presentations, images, slideshows, visual content (one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
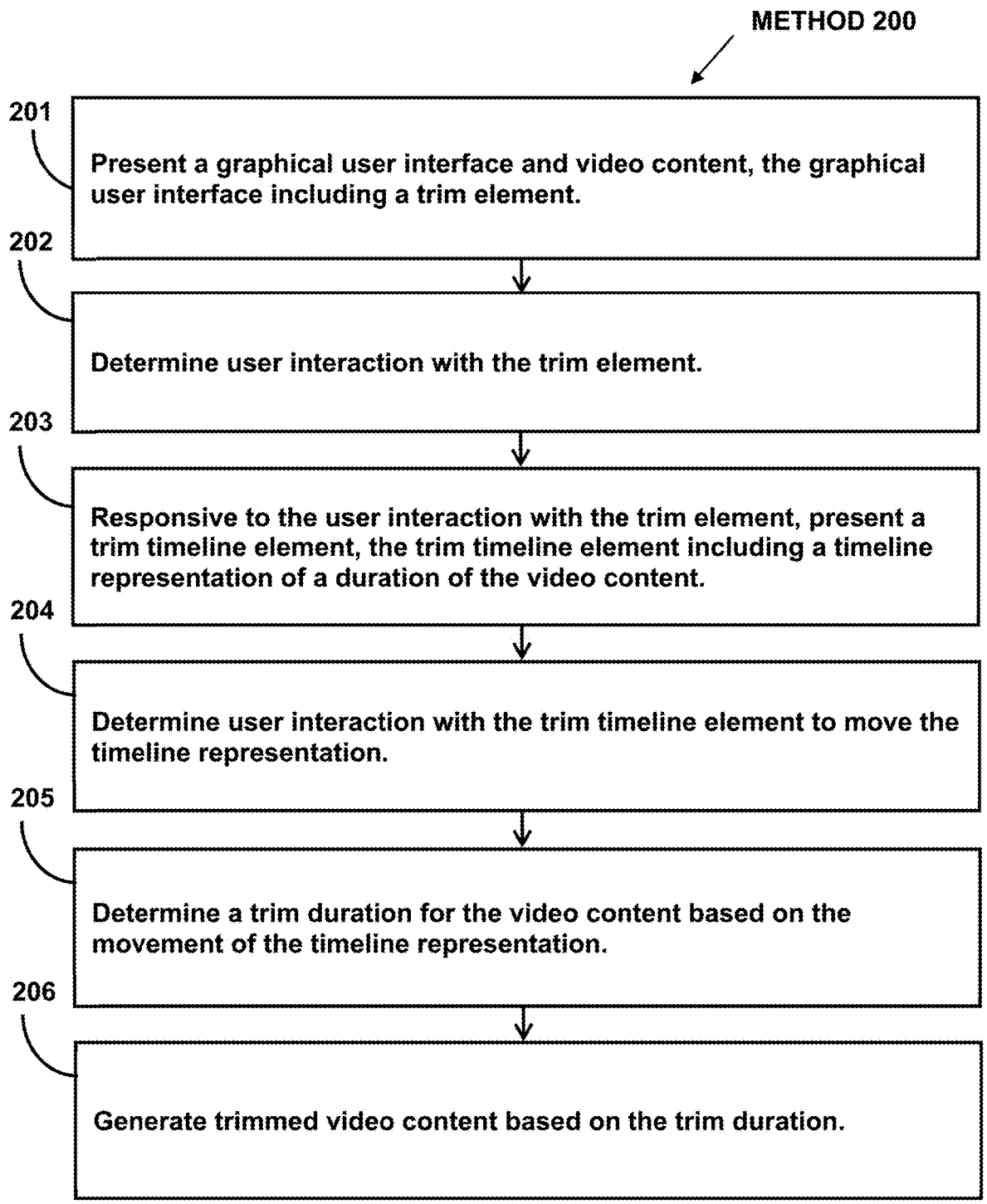
FIG. 2 illustrates a method for presenting an interface for trimming videos.

FIG. 2 illustrates method 200 for presenting an interface for trimming videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, a graphical user interface and video content may be presented on a touchscreen display. The touchscreen display may be configured to present the video content and receive user input during the presentation of the video content. The touchscreen display may be configured to generate output signals indicating location of a user's engagement with the touchscreen display. The video content may have a duration. The graphical user interface may include interface elements and may facilitate interaction of the user with one or more of the interface elements via the user input. The interface elements may include a trim element. In some implementation, operation 201 may be performed by a processor component the same as or similar to the presentation component 102 (Shown in FIG. 1 and described herein).

At operation 202, user interaction with the trim element may be determined. In some implementations, operation 202 may be performed by a processor component the same as or similar to the user interaction component 104 (Shown in FIG. 1 and described herein).

At operation 203, responsive to the user interaction with the trim element, a trim timeline element may be presented. The trim timeline element may include a timeline representation of the duration of the video content. The trim timeline element may enable selection of a trim duration for the video content based on movement of the timeline representation. A time amount of the duration represented by a portion of the timeline representation may be set independent of the duration of the video content such that the movement of the timeline representation corresponds to movement through the duration at a constant scale regardless of the duration. In some implementations, operation 203 may be performed by a processor component the same as or similar to the presentation component 102 (Shown in FIG. 1 and described herein).

At operation 204, user interaction with the trim timeline element to move the timeline representation may be determined. In some implementations, operation 204 may be performed by a processor component the same as or similar to the user interaction component 104 (Shown in FIG. 1 and described herein).

At operation 205, the trim duration for the video content may be determined based on the movement of the timeline representation and/or other information. In some implementations, operation 205 may be performed by a processor component the same as or similar to the trim duration component 106 (Shown in FIG. 1 and described herein).

At operation 206, trimmed video content may be generated based on the trim duration and/or other information. In some implementations, operation 206 may be performed by a processor component the same as or similar to the trimmed video content component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that presents an interface for trimming a video, the system comprising:
a touchscreen display configured to present video content and receive user input during the presentation of the video content, the video content having a video duration, wherein the touchscreen display is configured to generate output signals indicating location of a user's engagement with the touchscreen display; and
one or more physical processors configured by machine-readable instructions to:
present a graphical user interface and the video content on the touchscreen display, the graphical user interface including interface elements and facilitating interaction of the user with one or more of the interface elements via the user input, wherein the interface elements include a trim element;
determine user interaction with the trim element;
responsive to the user interaction with the trim element, present a trim timeline element, the trim timeline element including a timeline representation of the video duration of the video content and enabling selection of a trim duration for the video content based on movement of the timeline representation, wherein a time amount of the video duration of the video content represented by a portion of the timeline representation is set independent of the video duration of the video content such that the movement of the timeline representation corresponds to movement through the video duration of the video content at a constant scale regardless of the video duration of the video content, further wherein the graphical user interface does not include handles representing a beginning or an end of the trim duration until the timeline representation is moved by a user, further wherein the graphical user interface includes a trim position element on top of the timeline representation, the trim position element including a single line representing a time point that stays fixed at a middle of the timeline representation, the trim position element representing a current trim position, the single line at the middle of the timeline representation dividing duration portions of the video content that have and have not been selected for inclusion in the trim duration, wherein a first duration portion of the video content that has been selected for inclusion in the trim duration is depicted on a first side of the single line and a second duration portion of the video content that has not been selected for inclusion in the trim duration is depicted on a second side of the single line opposite the first side;
determine user interaction with the trim timeline element to move the timeline representation, wherein the movement of the timeline representation causes a first handle to be presented, the first handle representing a first end of the trim duration, and causes the trim position element to represent a second end of the trim duration;
determine the trim duration for the video content based on the movement of the timeline representation across the single line of the trim position element, wherein the trim duration corresponds to an amount of the timeline representation moved across the single line of the trim position element via the movement of the timeline representation, wherein length of the trim duration is determine based on the amount of the timeline representation moved across the single line of the trim position element such that greater movement of the timeline representation across the single line of the trim position element results in longer length of the trim duration and lesser movement of the timeline representation across the single line of the trim position element results in shorter length of the trim duration; and
generate trimmed video content based on the trim duration.

2. The system of claim 1, wherein a second handle element is presented to replace the trim position element based on determination of user interaction to fix the trim duration, the second handle element representing a second end of the trim duration.

3. The system of claim 2, wherein the first handle element or the second handle element is manipulatable along the timeline representation to change the trim duration.

4. The system of claim 2, wherein responsive to a current view of the timeline representation not including the first end of the trim duration, a floating shortcut element for the first handle element is presented within the timeline representation, the floating shortcut element presented on top of the timeline representation, user interaction with the floating shortcut element causing movement of the timeline representation to include the first end of the trim duration within the current view of the timeline representation, further wherein responsive to the current view of the timeline representation including the first end of the trim duration, the floating shortcut element is not presented within the timeline representation.

5. The system of claim 1, wherein the movement of the timeline representation based on the user interaction with the trim timeline element causes a current play position for the video content to be changed.

6. The system of claim 1, wherein the user interaction with the trim timeline element to move the timeline representation includes dragging the timeline representation.

7. The system of claim 1, wherein the user interaction with the trim timeline element to move the timeline representation includes engaging a play element to cause playback of the video content.

8. The system of claim 1, wherein a summary trim element is presented to indicate a relative position of the trim duration within the video duration of the video content.

9. A method for presenting an interface for trimming a video, the method performed by a computing system including one or more processors, the method comprising:

presenting, by the computing system, a graphical user interface and video content on a touchscreen display, the touchscreen display configured to present the video content and receive user input during the presentation of the video content, wherein the touchscreen display is configured to generate output signals indicating location of a user's engagement with the touchscreen display, the video content having a video duration, the graphical user interface including interface elements and facilitating interaction of the user with one or more of the interface elements via the user input, wherein the interface elements include a trim element;

determining, by the computing system, user interaction with the trim element;

responsive to the user interaction with the trim element, presenting, by the computing system, a trim timeline element, the trim timeline element including a timeline representation of the video duration of the video content and enabling selection of a trim duration for the video content based on movement of the timeline representation, wherein a time amount of the video duration of the video content represented by a portion of the timeline representation is set independent of the video duration of the video content such that the movement of the timeline representation corresponds to movement through the video duration of the video content at a constant scale regardless of the video duration of the video content, further wherein the graphical user interface does not include handles representing a beginning or an end of the trim duration until the timeline representation is moved by a user, further wherein the graphical user interface includes a trim position element on top of the timeline representation, the trim position element including a single line representing a time point that stays fixed at a middle of the timeline representation, the trim position element representing a current trim position, the single line at the middle of the timeline representation dividing duration portions of the video content that have and have not been selected for inclusion in the trim duration, wherein a first duration portion of the video content that has been selected for inclusion in the trim duration is depicted on a first side of the single line and a second duration portion of the video content that has not been selected for inclusion in the trim duration is depicted on a second side of the single line opposite the first side;

determining, by the computing system, user interaction with the trim timeline element to move the timeline representation, wherein the movement of the timeline representation causes a first handle to be presented, the first handle representing a first end of the trim duration, and causes the trim position element to represent a second end of the trim duration;

determining, by the computing system, the trim duration for the video content based on the movement of the timeline representation across the single line of the trim position element, wherein the trim duration corresponds to an amount of the timeline representation moved across the single line of the trim position element via the movement of the timeline representation, wherein length of the trim duration is determine based on the amount of the timeline representation moved across the single line of the trim position element such that greater movement of the timeline representation across the single line of the trim position element results in longer length of the trim duration and lesser movement of the timeline representation across the single line of the trim position element results in shorter length of the trim duration; and generating, by the computing system, trimmed video content based on the trim duration.

10. The method of claim 9, wherein a second handle element is presented to replace the trim position element based on determination of user interaction to fix the trim duration, the second handle element representing a second end of the trim duration.

11. The method of claim 10, wherein the first handle element or the second handle element is manipulatable along the timeline representation to change the trim duration.

12. The method of claim 10, wherein responsive to a current view of the timeline representation not including the first end of the trim duration, a floating shortcut element for the first handle element is presented within the timeline representation, the floating shortcut element presented on top of the timeline representation, user interaction with the floating shortcut element causing movement of the timeline representation to include the first end of the trim duration within the current view of the timeline representation, further wherein responsive to the current view of the timeline representation including the first end of the trim duration, the floating shortcut element is not presented within the timeline representation.

13. The method of claim 9, wherein the movement of the timeline representation based on the user interaction with the trim timeline element causes a current play position for the video content to be changed.

14. The method of claim 9, wherein the user interaction with the trim timeline element to move the timeline representation includes dragging the timeline representation.

15. The method of claim 9, wherein the user interaction with the trim timeline element to move the timeline representation includes engaging a play element to cause playback of the video content.

16. The method of claim 9, wherein a summary trim element is presented to indicate a relative position of the trim duration within the video duration of the video content.

* * * * *